(12) United States Patent
Grundy et al.

(10) Patent No.: US 11,725,715 B1
(45) Date of Patent: Aug. 15, 2023

(54) ADVANCE AND HOLD PAWL ACTUATOR

(71) Applicant: Opsis Health, Inc., Golden, CO (US)

(72) Inventors: Kevin P. Grundy, Emmett, ID (US); Roger Sharpe, Mountain View, CA (US); Ryan Liu, Fremont, CA (US)

(73) Assignee: Opsis Health, Inc., Golden, CO (US)

( * ) Notice: Subject to any disclaimer, the term of this patent is extended or adjusted under 35 U.S.C. 154(b) by 0 days.

(21) Appl. No.: 17/402,327

(22) Filed: Aug. 13, 2021

Related U.S. Application Data (60) Provisional application No. 63/065,463, filed on Aug. 13, 2020.

(51) Int. Cl.
*F16H 31/00* (2006.01)

(52) U.S. Cl.
CPC ......... *F16H 31/005* (2013.01); *F16H 31/007* (2013.01)

(58) Field of Classification Search
CPC .... F16H 31/003; F16H 31/005; F16H 31/007; F16H 31/004
USPC ... 74/137, 142, 143, 154, 577 S, 577 R, 149
See application file for complete search history.

(56) References Cited

U.S. PATENT DOCUMENTS

| | | | | |
|---|---|---|---|---|
| 2,526,263 A * | 10/1950 | Neal | ...................... | F16H 31/005 254/108 |
| 2,900,840 A * | 8/1959 | Greve | ..................... | H01H 67/06 74/160 |
| 2,990,723 A * | 7/1961 | Holpuch | ................. | F16D 71/00 74/144 |
| 3,527,140 A * | 9/1970 | Smith, Sr. | ............. | F15B 15/061 91/170 R |
| 5,739,490 A | 4/1998 | Amonett et al. | | |
| 5,915,589 A | 6/1999 | Lim | | |
| 7,191,674 B1 * | 3/2007 | Devenyi | ............... | F16H 31/007 74/110 |
| 7,766,397 B2 | 8/2010 | Carabalona | | |
| 10,197,134 B2 | 2/2019 | Wys et al. | | |
| 10,724,582 B2 | 7/2020 | Klaser et al. | | |
| 2002/0069941 A1 * | 6/2002 | Narasimhiah | ......... | F16H 31/005 148/402 |
| 2011/0146265 A1 * | 6/2011 | Joseph | .................. | F16H 31/007 74/25 |

OTHER PUBLICATIONS

"Encoder Working Principle". Inst Tools. Jun. 14, 2019. Oct. 19, 2022 [https://instrumentationtools.com/encoder-working-principle/]. [https://web.archive.org/web/20190614120821/https://instrumentationtools.com/encoder-working-principle/] (Year: 2019).*

* cited by examiner

*Primary Examiner* — Joseph Brown
(74) *Attorney, Agent, or Firm* — Jaffery Watson Mendonsa & Hamilton LLP (57) ABSTRACT

In an actuator system having a toothed actuator and a tensioner to apply a tension force to the toothed actuator, a hold mechanism holds the tooth actuator stationary, through disengage-able contact with at least one tooth thereof, with respect to a direction of the tension force while allowing the tooth actuator to move freely in a direction opposite the direction of the tension force. An advancement pawl having at least two degrees of freedom engages with one or more teeth on the tooth actuator to displace the tooth actuator a distance in the direction opposite of the direction of the tension force.

20 Claims, 14 Drawing Sheets

ADVANCE AND HOLD PAWL ACTUATOR

CROSS REFERENCE TO RELATED APPLICATIONS

This application hereby incorporates by reference and claims the benefit of U.S. provisional application No. 63/065,463 filed Aug. 13, 2020.

BACKGROUND

The use of actuators has steadily increased. Actuators are being designed into smaller products where space is limited, and low cost is required. Using traditional actuators such as motors and solenoids becomes difficult owing to their size, cost and footprint. Furthermore, actuators with high precision, speed and force while providing a desired set of features for an application may also comprise unnecessary higher cost. An actuator which provides high flexibility in its implementation while providing a desired actuation at minimal cost enables wider use of actuators in smaller products.

DRAWINGS

The various embodiments disclosed herein are illustrated by way of example, and not by way of limitation, in the figures of the accompanying drawings and in which like reference numerals refer to similar elements and in which.

DETAILED DESCRIPTION

The design of an actuator or actuating system that is compact, low cost and capable of being placed in small or confined spaces enables wider use. Motors and solenoids are often used to implement actuation systems. However, their size and expense may preclude their use in applications limited in space or cost. If the requirements of a design do not require high levels of performance (speed, positional accuracy, force for example), further relaxation of actuator cost or size is available. Shape-memory alloys, in the form of wire possess interesting capabilities, which when combined with novel mechanical structures enables cost effective fit-for-purpose actuators or actuator systems. Shape-metal memory alloys while providing excellent capabilities for generating short distance displacements are not directly suited for applications requiring quick, large or forceful displacements. The embodiments disclose herein comprise various structures and methods for utilizing multiple short distant displacement actuation like that provided by shape-metal memory alloys to achieve greater actuation capability through the use of pawls and tensioners.

Figure 1:
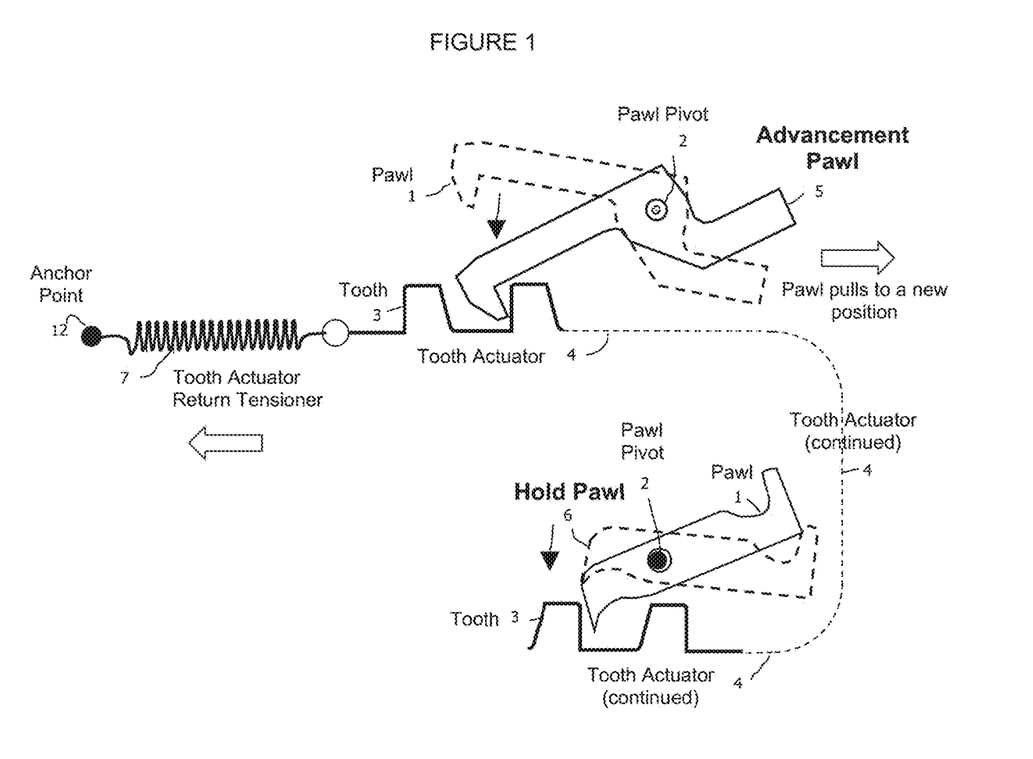
FIG. 1 illustrates an Advancement Pawl and Hold Pawl Actuator.

FIG. 1 illustrates an embodiment of an Advancement Pawl and Hold Pawl Actuator which converts short distance actuation motion like that generated by shape-memory metal alloy into larger, more useful actuation motion. It is comprised of a Tooth Actuator 4, a Tooth Actuator Return Tensioner 7, an Advancement Pawl 5 and a Hold Pawl 4. The Tooth Actuator 4 is comprised of multiple Teeth 3. The Teeth 3 provide a means for pawls to engage the Tooth Actuator 4. The Advancement Pawl 5 acts upon the Tooth Actuator 4 to move the Tooth Actuator 4 to a new position in a direction opposite of the tensioning force provided by the Tooth Actuator Return Tensioner 7. The Hold Pawl 6 acts upon the Tooth Actuator 4 to hold the Tooth Actuator 4 in the new, post-advancement, position against the tension. The Tooth 3 on the Tooth Actuator 4 is designed to optimize the engagement and disengagement of pawls. In the embodiment shown in FIG. 1, the Tooth 3 has one vertical face and one sloping face. The Advancement Pawl 5 is comprised of a shape optimized for advancing the Tooth Actuator 4. The Hold Pawl 6 is comprised of a shape for holding the Tooth Actuator 4. Both the Advancement Pawl 5 and the Hold Pawl 6 are further comprised of a Pawl Pivot 2 which enables the pawls to engage and disengage from the Tooth Actuator 4. FIG. 1 further illustrates the Tooth Actuator 4 with the Advancement Pawl 5 operating on one section of the Tooth Actuator 4 while the Hold Pawl 6 operates on another section of the Tooth Actuator 4. A Tooth Actuator 4 may have Teeth 3 anywhere upon its surface. There is no requirement for the Teeth 3 shape or size to be the same on the Tooth Actuator 4 for the Advancement Pawl 5 or the Hold Pawl 6. The Teeth 3 may be optimized for a specific pawl shape along different regions of the Tooth Actuator 3.

Figure 2:
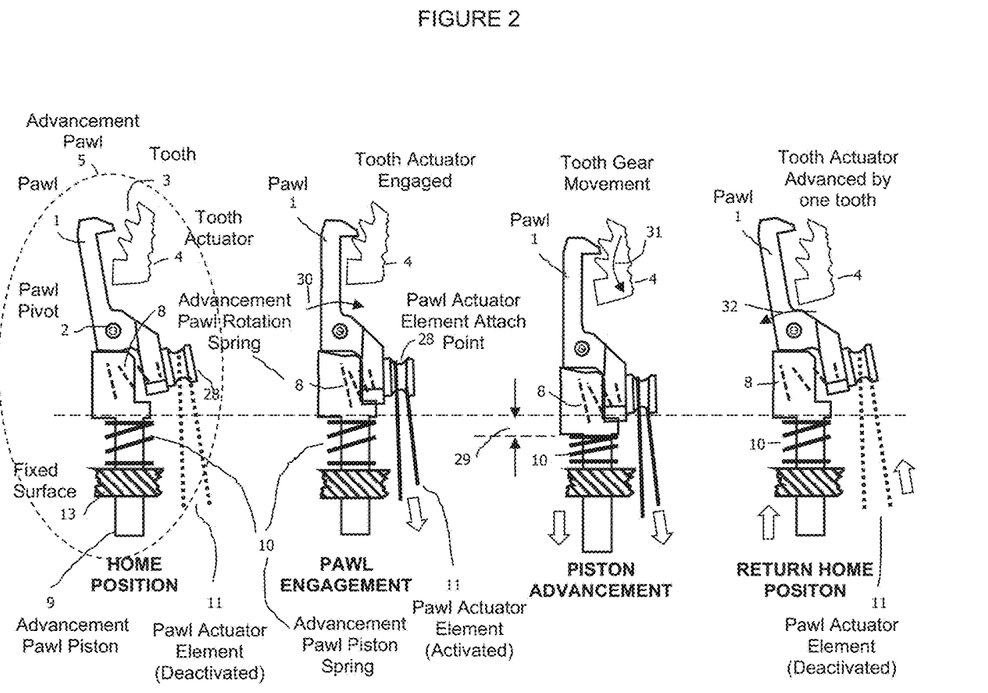
FIG. 2 illustrates an Advancement Pawl and Hold Pawl and its basic operation.

While FIG. 1 illustrates the basic pawl and tensioner method for actuation, FIG. 2 illustrates an embodiment of an Advancement Pawl 5 and its basic advancement sequence. There are four sequence diagrams: HOME POSITON; PAWL ENGAGEMENT; PISTON ADVANCEMENT and RETURN HOME POSITION. Referring to the HOME POSITION illustration: The Advancement Pawl 5 shown is comprised of an Advancement Pawl Piston 9, an Advancement Pawl Piston Spring 10, a Pawl 1, a Pawl Pivot 2 an Advancement Pawl Rotation Spring 8, a Pawl Actuator Element Attach Point 28 and a Pawl Actuator Element 11. In the HOME POSITION, the Advancement Pawl 5 is disengaged from the Tooth Actuator 4. This is achieved by the Advancement Pawl Rotation Spring 8 pushing the Pawl 1 away from the Tooth Actuator 4 through the Pawl Pivot 2. Furthermore, the Advancement Pawl Piston Spring 10 keeps the Advancement Pawl Piston 9 away from the Fixed Surface 13 through expansive force. In one embodiment The Pawl Actuator Element 11 is a shape memory wire which reduces in length when a current is passed through it. It is shown in the HOME POSITION as deactivated. Referring to the PAWL ENGAGEMENT illustration in FIG. 2: The Pawl Actuator Element 11 pulls on the Pawl Actuator Element Attach Point 28 and as a result, the Pawl 1 rotates clockwise 30 thereby causing the Pawl 1 to engage with the Tooth Actuator 4. When the Pawl 1 is engaged and there is no further rotational motion possible, the force being applied to the Pawl Actuator Element Attach Point 28 causes the Advancement Pawl Piston 9 to move downward against the force of the Advancement Pawl Piston Spring 10. This is shown in the PISTON ADVANCEMENT illustration in FIG. 2. The vertical displacement of the Advancement Pawl Piston 9 is shown as a vertical displacement 29. This vertical displacement is transferred to the Tooth Actuator 4 in a counterclockwise direction 31. In the RETURN HOME POSITION illustration it presents a Pawl Actuator Element 11 in a deactivated state with the Advancement Pawl Piston Spring 10 pushing the Advancement Pawl Piston 9 back to its nominal starting position and the Advancement Pawl Rotation Spring 8 pushing the Pawl 1 away from the Tooth Actuator 4. The Tooth Actuator 4 has been advanced by one Tooth 3 position. By repeating the sequence, the Tooth Actuator 4 is advanced multiple tooth positions.

Figure 3:
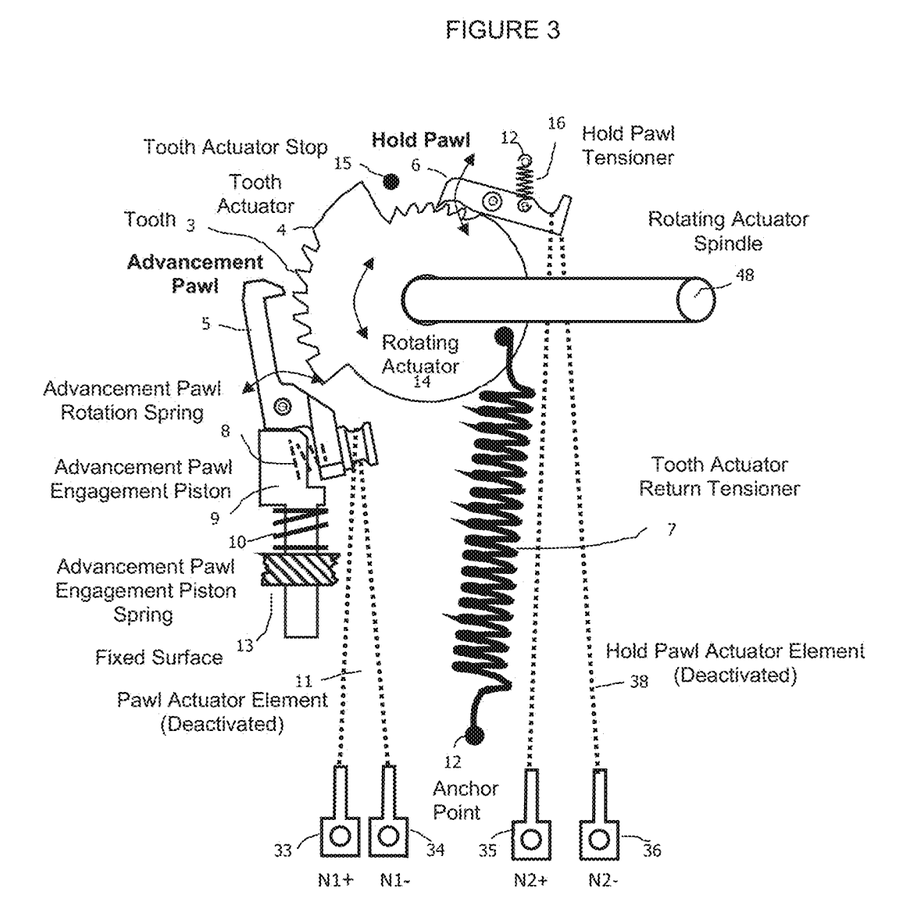
FIG. 3 illustrates a Rotational Pawl Actuator System.
Figure 4:
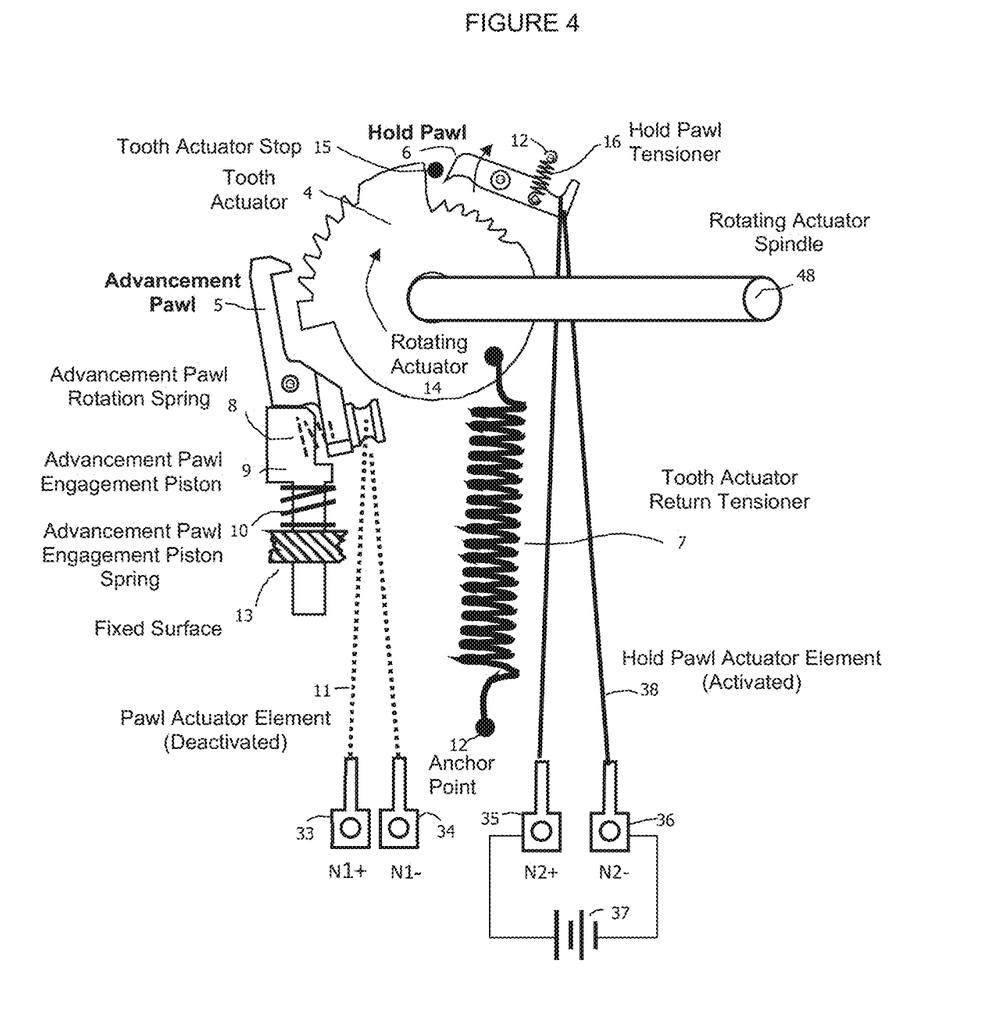
FIG. 4 illustrates a Rotational Pawl Actuator System showing reset.
Figure 5:
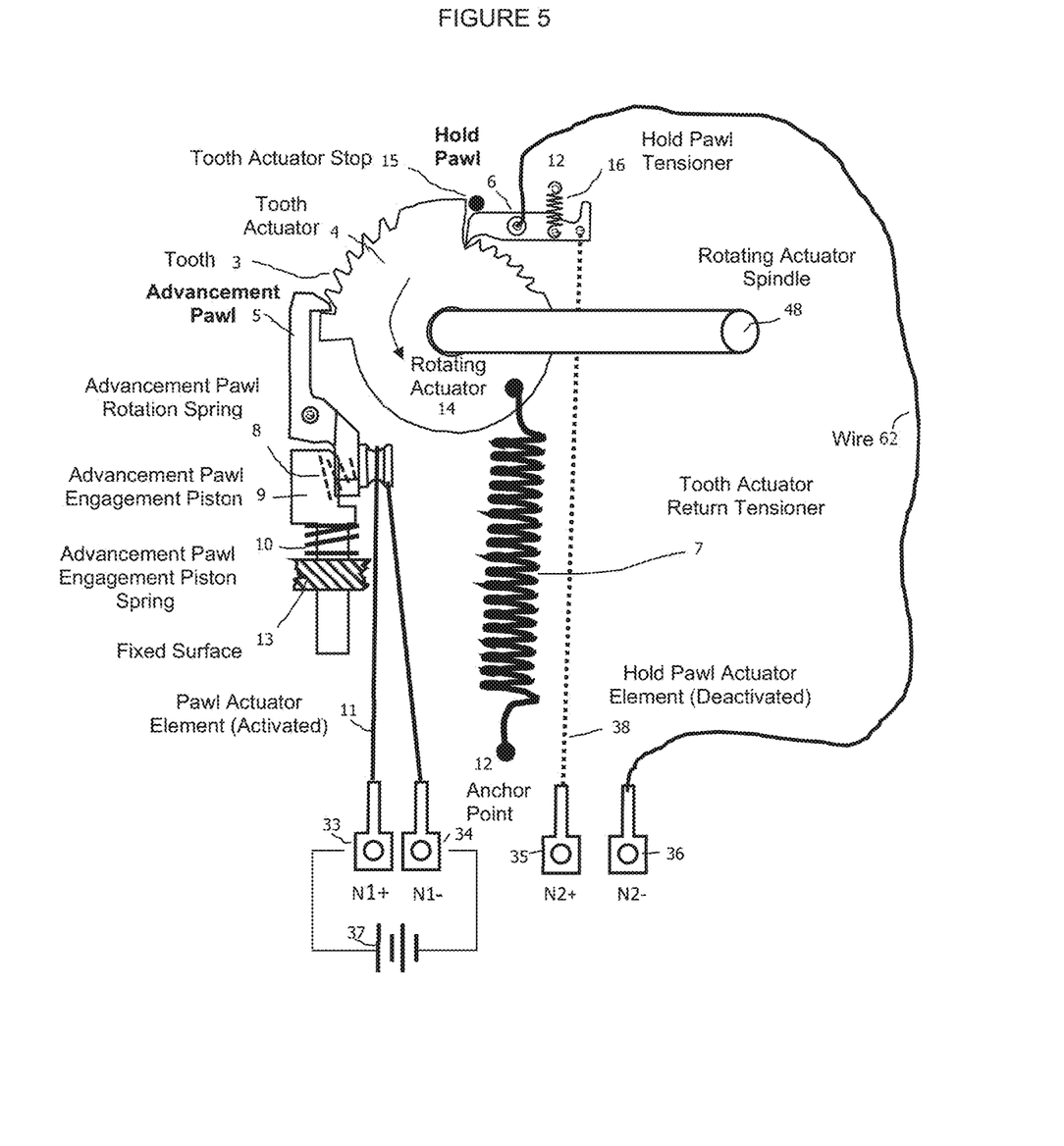
FIG. 5 illustrates a Rotational Pawl Actuator System showing advancement.

FIGS. 3, 4 and 5 illustrate an embodiment which translates small-stroke linear displacement into rotational actuation. These figures describe various elements and their participation in the actuation process. FIG. 3 illustrates a Rotational Pawl Actuator System. It comprises an Advancement Pawl 5 as described in the description for FIG. 2. The Rotational Pawl Actuator System is further comprised of a Tooth Actuator 4 which is designed as a Rotating Actuator 14 with a Rotating Actuator Spindle 48. To complete the system, a Hold Pawl 6, Hold Pawl Tensioner 16, Tooth Actuator Return Tensioner 7, Pawl Actuator Element 11 and Hold Pawl Actuator Element 38 comprises the system. In this embodiment, the Rotational Pawl Actuator System provides a means by which the Rotating Actuator Spindle 48 can be rotated and held in position. The Advancement Pawl 5, when activated through the shortening of the Pawl Actuator Element 11 rotates the Rotating Actuator Spindle 48 counterclockwise against the Tooth Actuator Return Tensioner 7. Once the Advancement Pawl 5 has rotated the Rotating Actuator 14 by the distance of a Tooth 3, the Hold Pawl 6 rides over the top of a Tooth 3 and holds the Rotating Actuator 14 in the new position. The process of advancement continues until the Hold Pawl 6 can no longer hold the position of the Rotating Actuator 14 because there is no Tooth 3 available.

FIG. 4 illustrates the Rotational Pawl Actuator System being reset to starting position. A reset is achieved when the Rotating Actuator 14 is repositioned to where the Rotating Actuator 14 rests upon the Tooth Actuator Stop 15. The Tooth Actuator Return Tensioner 7 provides the force needed to rotate the Rotating Actuator 14 clockwise. In this embodiment, to initiate a reset, the Hold Pawl Actuator Element 38 is activated by passing an electrical current through it causing it to reduce in length and as a result pulls against the Hold Pawl Tensioner 16 and ultimately disengages the Hold Pawl 6 from the Tooth Actuator 4 allowing it to rotate until the Tooth Actuator Stop 15 rests against the Tooth Actuator 4.

FIG. 5 illustrates a Rotational Pawl Actuator System showing advancement. FIG. 5 shows how the advancement sequences described in the description of FIG. 2 is applied to a Rotational Pawl Actuator System. In this embodiment, a current is applied to the Pawl Actuator Element 11 which in turns shortens the element and causes the Advancement Pawl 5 to engage the Rotating Actuator 14. At the end of the stroke, the Rotating Actuator 14 has been rotated counterclockwise such that the Hold Pawl 6 keeps the Rotating Actuator 14 in its new position. The amount of rotation is governed by the Tooth 3 spacing. In this embodiment the tooth spacing is equal for the Advancement Pawl 5 and the Hold Pawl 6. In other embodiments, the tooth spacing of the Hold Pawl 6 can be less than the tooth spacing of the Advancement Pawl 5 allowing for smaller advancements. The stroke of the Advancement Pawl 5 can be less than a full stroke by modulating the current in the Pawl Actuator Element 11. FIG. 5 further shows an embodiment of the Hold Pawl Actuator Element 38 comprising a single length of shaped memory wire to activate the Hold Pawl 6. In FIG. 4, the Hold Pawl 6, is pulled away from the Tooth Actuator through a single Hold Pawl Actuator Element 11 which is looped around the Hold Pawl 6. In the FIG. 5 embodiment, a single shaped memory wire is used and is directly attached to the Hold Pawl 6 thereby terminating there. A separate, non-memory shaped wire 62 is attached to the Hold Pawl 6 and provides a current return path for the activation of the Hold Pawl Actuator Element 38.

Figure 6:
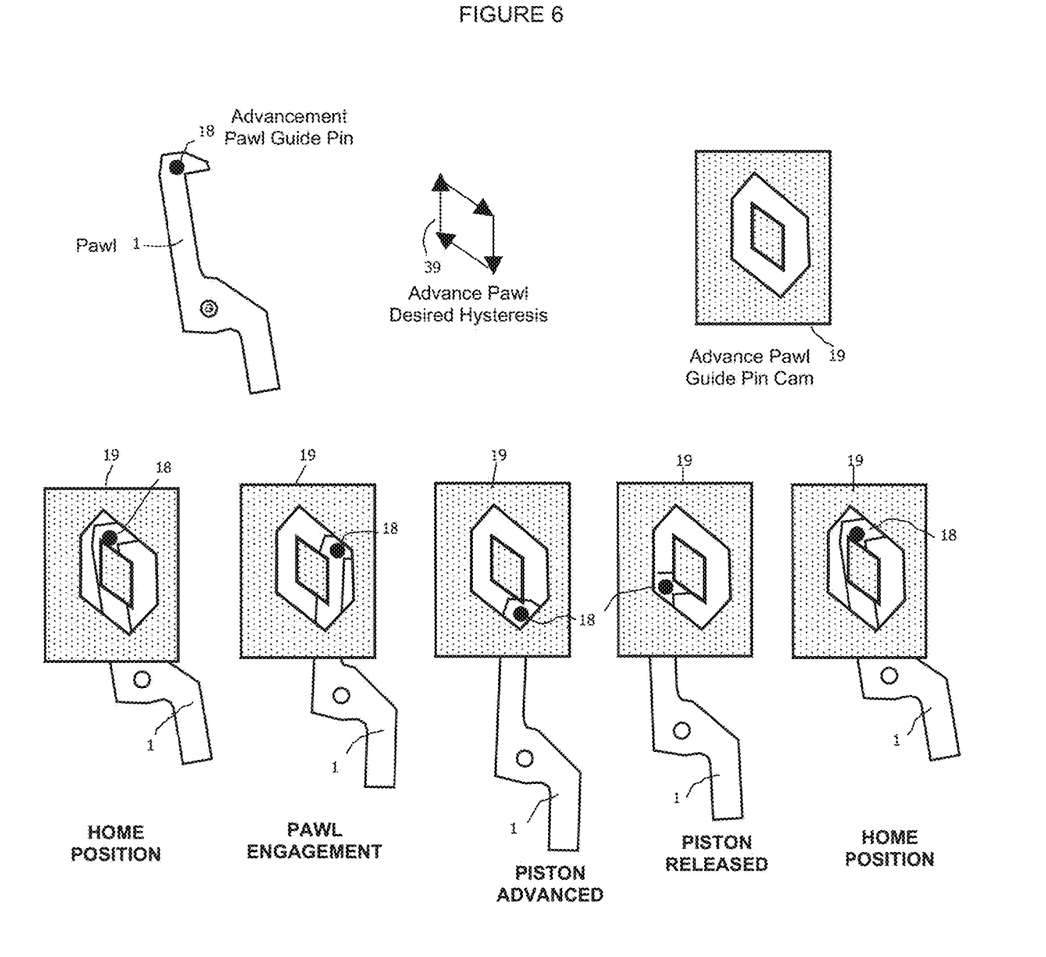
FIG. 6 illustrates Pawl guidance with a pin and a cam.

The activation cycle of an advancement pawl to a Tooth Actuator 4 may require more complex motion. In embodiments illustrated in this disclosure the Advancement Pawl 5 (FIG. 2) is comprised of a linear and rotating motion. In other embodiments it is possible to achieve more complex pawl motions through a pawl guide pin and a cam. FIG. 6 illustrates the use of an Advancement Pawl Guide Pin 18 attached to the Pawl 1 in conjunction with an Advance Pawl Guide Pin Cam 19. An example desired path, Advance Pawl Desired Hysteresis 39 is shown. The Advanced Pawl Guide Pin Cam 19 is designed to implement the path. The Advancement Pawl Guide Pin 18 is attached to the Pawl 1 and is guided through the Advance Pawl Guide Pin Cam 19.

Figure 7:
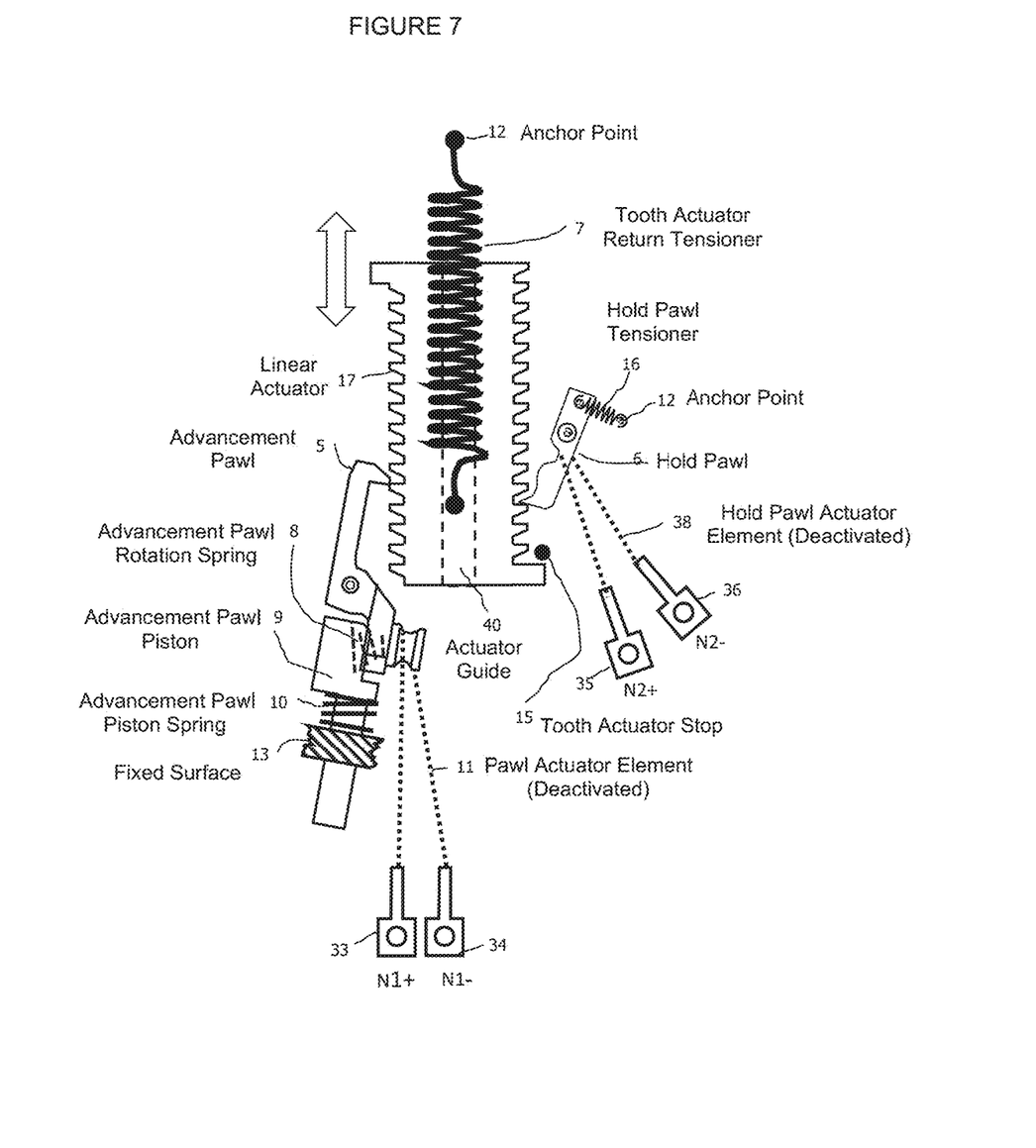
FIG. 7 illustrates a Linear Pawl Actuator system.

There are no limits on the size and shapes of the tooth actuators comprising embodiments or where pawls are located. FIG. 7 illustrates a Linear Actuator 17 with an Advancement Pawl 5 and a Hold Pawl 6. In this embodiment the pawls are on opposite sides of the actuator.

Figure 8:
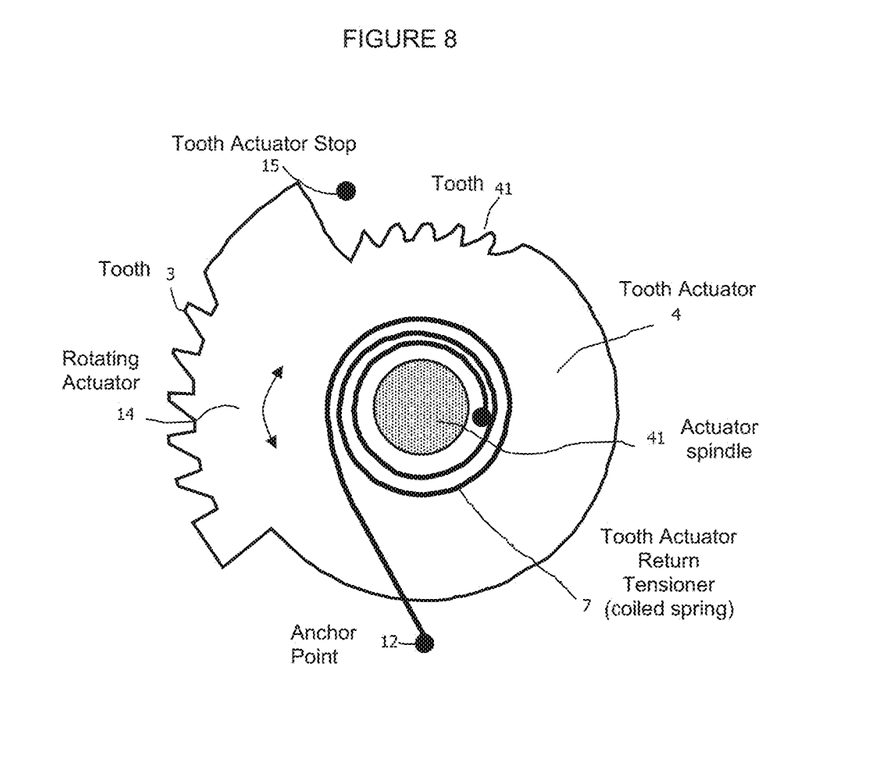
FIG. 8 illustrates a Rotational Actuator torsional spring return tensioner.

There are no limits to the types of tensioners used for embodiments. FIG. 8 illustrates the use of coiled wire spring for the Tooth Return Tensioner 7 for a Rotating Actuator 14.

Figure 9A:
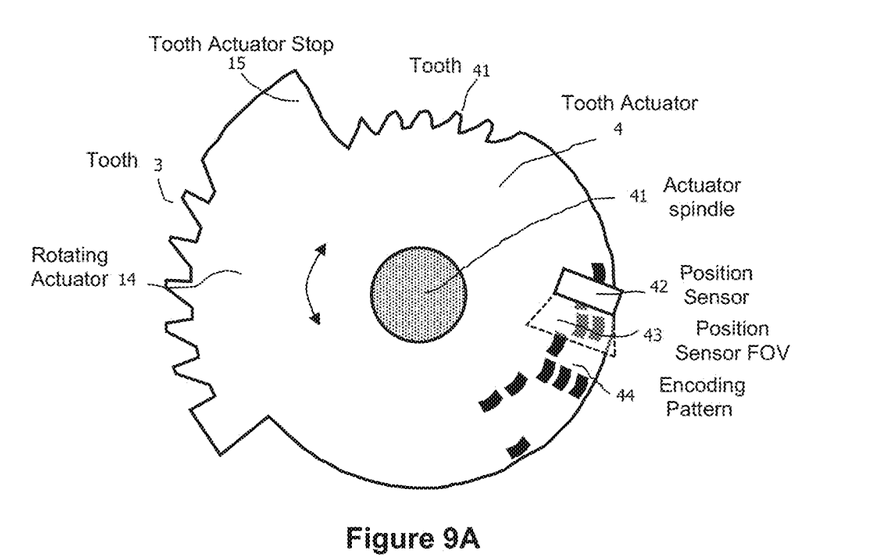
FIGS. 9A and 9B illustrates Actuator position patterns and sensors.
Figure 9B:
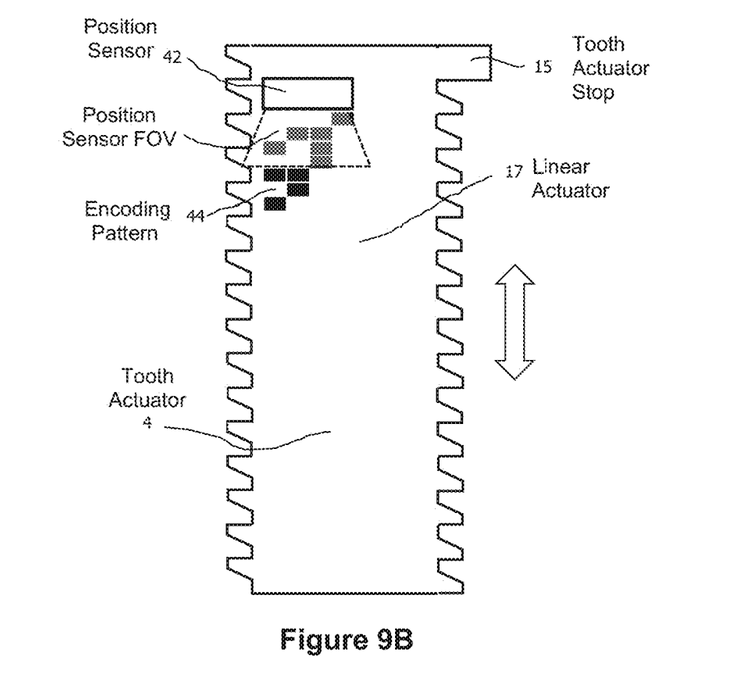

A benefit of the advance and hold actuation is the ability to keep track of position through the counting of advancement and reset activations. When starting from a reset position, keeping track of the number of advancement activations provides positioning information. However, in some embodiments it may be advantageous to include positional sensors. FIGS. 9A and 9B illustrate the use of a Position Sensor 42 along with an Encoding Pattern 44 used by the Position Sensor 42. The Position Senor 42 may be electrical or optical or other means of discerning position.

Figure 10:
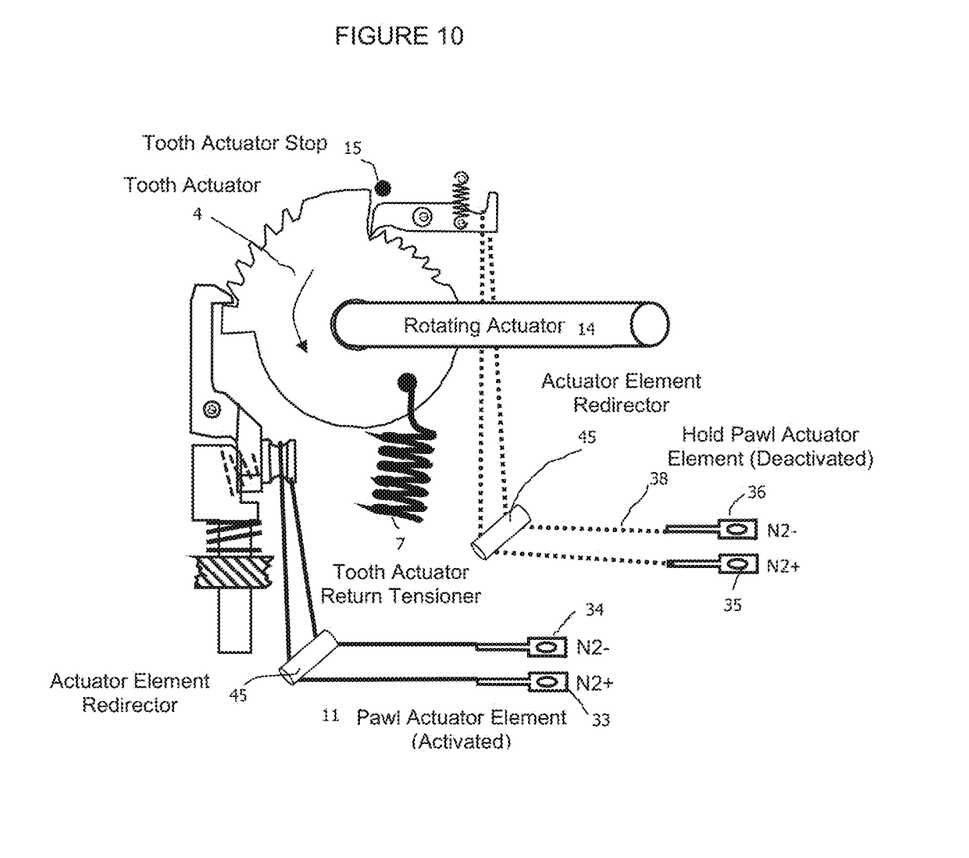
FIG. 10 illustrates a Rotational Actuator with multidirectional actuation elements.

A benefit of the advance and hold actuation is the ability to fit implementations into small and irregular spaces. To facilitate this, actuator elements need not be straight. FIG. 10 illustrates an embodiment that employs an Actuator Element Redirector 45 to change direction. These Actuator Element Redirectors 45 may be comprised of, but not limited smooth surfaces, bearings or levers.

Figure 11:
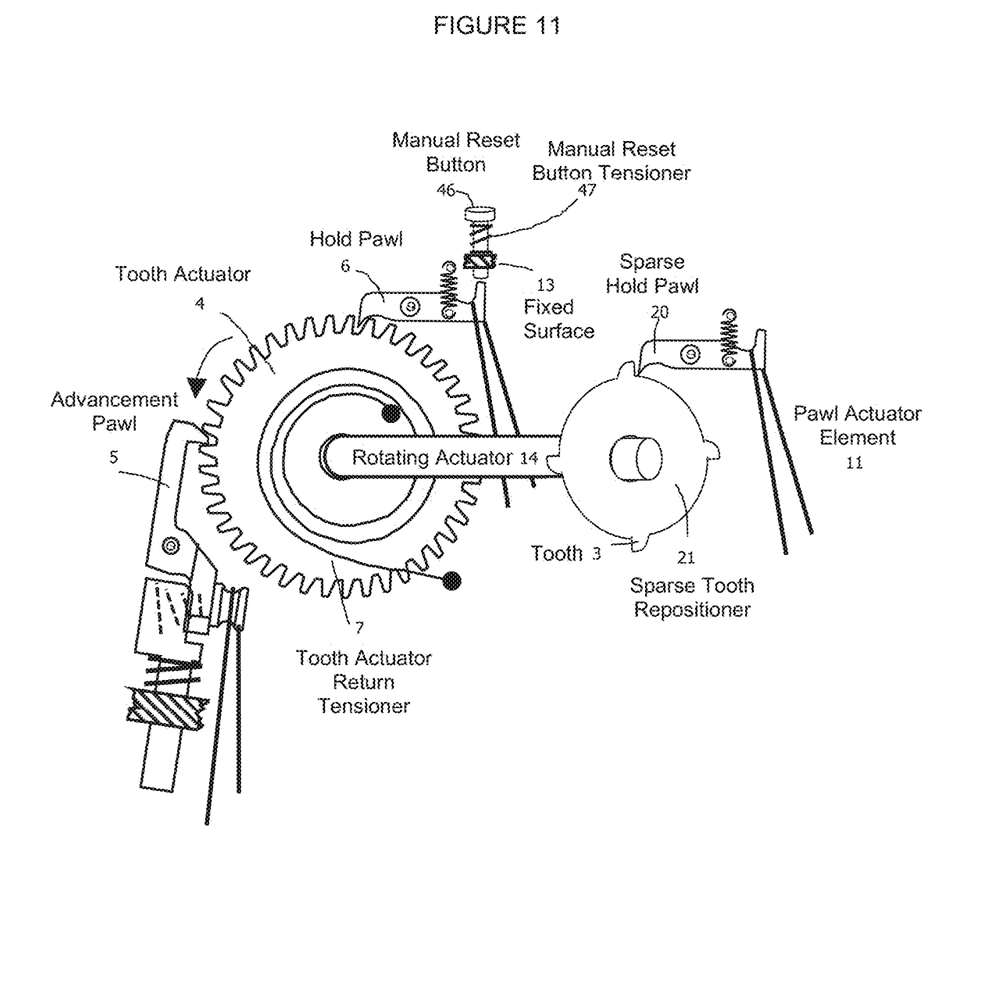
FIG. 11 illustrates a Rotational Actuator with Sparse Tooth Repositioner.

In another embodiment, a Rotating Actuator 14 need not be limited to less than a full rotation. Furthermore, an actuator may have additional hold pawls thereby providing positioning zones. FIG. 11 illustrates a Rotational Actuator 14 comprising a Tooth Actuator 4 with no stops and the addition of a Sparse Tooth Repositioner 21. In this embodiment, there is a Hold Pawl 6 which has an equivalent tooth spacing to that of the Advancement Pawl 5. However, a Sparse Tooth Repositioner 21 is added which has fewer teeth. In FIG. 11, there is only 4 teeth shown. Without the Sparse Tooth Repositioner 21, a reset allows the Tooth Actuator 4 to rotate clockwise until there was no tension left in the Tooth Actuator Return Tensioner 7. This represents many advancement operations by the Advancement Pawl 5.

The Sparse Tooth Repositioner 21 is used to limit the amount of reset rotation as a type of programmable stop. As an example, if the Hold Pawl 6 is released and the Sparse Hold Pawl 20 is not released, then the Tooth Actuator 4 only travels ¼ of a full clockwise rotation before stopping. This allows for operating in specific positional zones. The spacing of the teeth 3 on the Sparse Tooth Repositioner 21 need not be regular. FIG. 11 further illustrates an embodiment of a Manual Reset Button 46 which through mechanical linkage provides for a manual reset function to the Tooth Actuator 4. The Manual Reset Button 46 provides a method to reset the Tooth Actuator 4 to a known position if there is no activation current for the Hold Pawl 6.

There are implementations of the advance and hold actuation which may be damaged if the actuator is back driven. In other words, if another external force, when applied to the actuator causes the actuator to move without damage, it is capable of being back driven. A likely failure in a back-drive situation would be the Hold Pawl 6 as shown in FIG. 4. However, if the actuator is susceptible to back driving damage, other embodiments for the hold function are disclosed.

Figure 12:
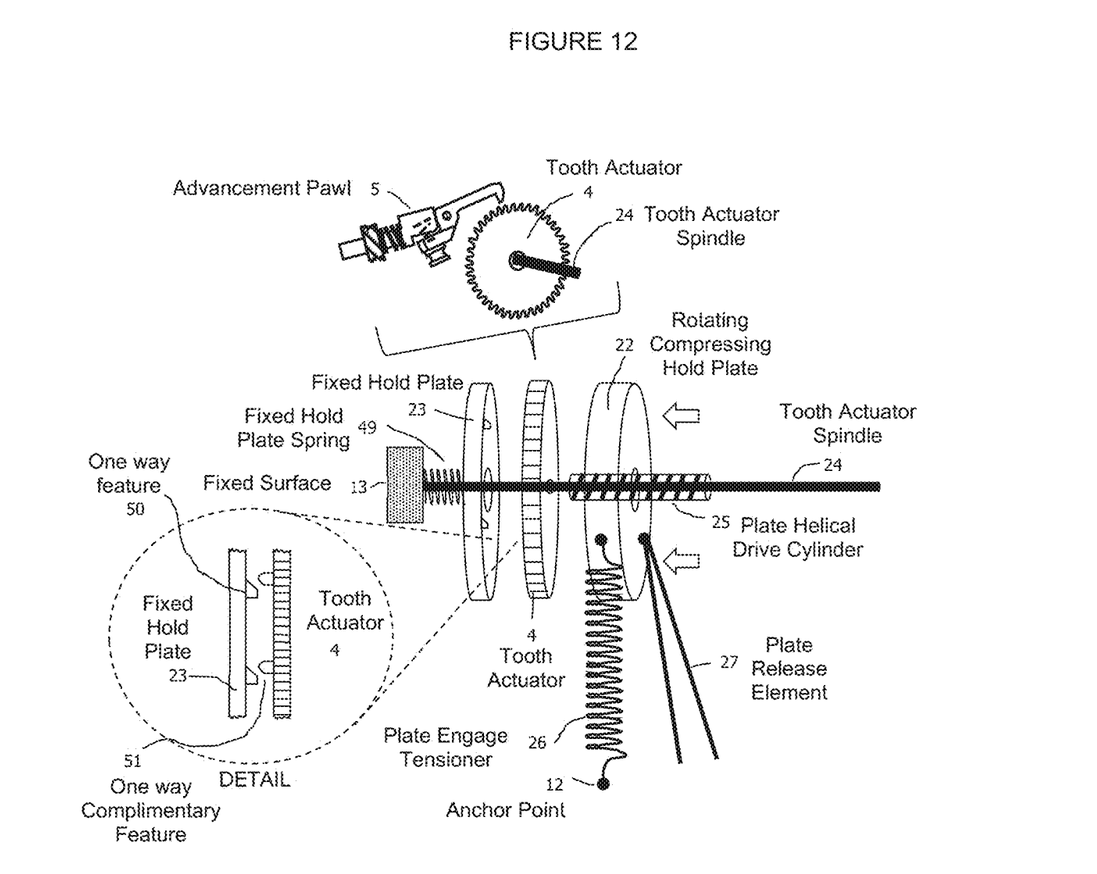
FIG. 12 illustrates a Hold Plate in place of a Hold Pawl.

FIG. 12 illustrates an embodiment having a hold plate system in place of a Hold Pawl to provide safe back driving. An embodiment is shown where an actuator is comprised of an Advancement Pawl 5 and a Tooth Actuator 4 with a Tooth Actuator Spindle 24. There is no Hold Pawl. Instead, a plate system is employed to hold the Tooth Actuator 4 after advancement. The plate system is comprised of a Fixed Hold Plate 23, a Rotating Compressing Hold Plate 22, a Plate Engage Tensioner 26, a Plate Release Element 27 and a Plate Helical Drive Cylinder 25. The Rotating Compressing Plate 22 has a center hole which has spiraling threads. These threads match the corresponding threads on the Plate Helical Drive Cylinder 25. The Rotating Compressing Plate 22 is mounted on the Plate Helical Drive Cylinder 25. The Plate Helical Drive Cylinder 25 does not rotate and is held stationary. When the Rotating Compressing Plate 22 is rotated clockwise, it moves to the right, away from the surface of the Tooth Actuator 4. When rotated counterclockwise, the Rotating Compressing Plate 22 moves to the left towards the surface of the Tooth Actuator 4 forcing it to rest against the Fixed Hold Plate 23. The Fixed Hold Plate 23 has a Fixed Hold Plate Spring on the opposite side. Its function is to create a force to push the Fixed Hold Plate 23 against the surface of the Tooth Actuator 4. The DETAIL area of FIG. 12 illustrates features installed on the Fixed Hold Plate 23 and Tooth Actuator 4 which prevent these two elements from slipping against each other in one direction. This is accomplished by placing one-way features on the surfaces. As shown in the DETAIL section a One Way Feature 50 on the Fixed Hold Plate 23 allows a Tooth Actuator 4 with its own One Way Complimentary Feature 51 to move downward in relation to the Fixed Hold Plate 23.

To fully understand the operation of the hold plate system an advancement and reset cycle are described. Referring to FIG. 12 and FIG. 2: With the Tooth Actuator Spindle 24 at its current rotational position, the Rotating Compressing Hold Plate 22 is pushed onto the left surface of the Tooth Actuator 4 because the Plate Helical Drive Cylinder 25 threads move the Rotating Compressing Hold Plate 22 against the Tooth Actuator 4. On the other side of the Tooth Actuator 4 is the Fixed Hold Plate 23. The Fixed Hold Plate 23 is pushed against the Tooth Actuator 4 by the Fixed Hold Plate Spring 49. In this state, the One Way Features 50 on the Fixed Hold Plate and the One Way Complimentary Features on the Tooth Actuator 4 are situated where these features do not allow the Tooth Actuator 4 to move clockwise against each other. The Fixed Hold Plate 23 while it can move back and forth along the axis of the Tooth Actuator Spindle 4, it does not rotate. The Tooth Actuator 4 is advanced through the actions and descriptions associated with FIG. 5. During the advancement, the One Way features of the Fixed Hold Plate 23 and the Tooth Actuator 4 allows for them to slide past each other and then arrange themselves so that Tooth Actuator 4 is advanced and holding its new position. Additional advancement cycles can take place with the Fixed Hold Plate 23 One Way Features ensuring that Tooth Actuator 4 does not slip back. To reset the Tooth Actuator 4 to its original starting position, the Rotating Compressing Hold Plate 22 needs to be backed away from the Tooth Actuator 4. This is accomplished by activating the Plate Release Element 27 such that its force is higher than the force of the Plate Engage Tensioner 26 which causes the Rotating Compressing Hold Plate 22 to rotate clockwise. Since the Rotating Compressing Hold Plate 22 is mounted on the Plate Helical Drive Cylinder 25 with threads, the Rotating Compressing Hold Plate 22 moves rightward and allows the Tooth Actuator 4 to move away from the Fixed Hold Plate 23 and consequently allows the Tooth Actuator Return Tensioner 7 to reset the Tooth Actuator 4 to its starting position. When the Plate Release Element 27 is deactivating the Plate Release Element 27 lengthens. When deactivated, the Plate Engage Tensioner 26 rotates the Rotate Compressing Hold Plate counterclockwise thus pushing the Tooth Actuator 4 against the Fixed Hold Plate 23 where once again, the One Way features prevents the Tooth Actuator 4 from rotating clockwise. This sequence is similar to the Hold Pawl 6 sequence described for the operation described as part of FIG. 2. During a back-drive situation where an external force may indiscriminately cause it to rotate, the Fixed Hold Plate 23, while held rotationally fixed is still able to move orthogonal to it rotational axis and move against its Fixed Hold Plate Spring 49 without incurring mechanical damage because the Fixed Hold Plate Spring 49 will allow the Fixed Hold Plate 23 and the Tooth Actuator 4 to move past each other without damage.

The Advancement Pawl 5 illustrated and described for FIG. 2 relies upon the Pawl Actuator Element 11 to both rotate the pawl and to provide linear displacement through the Advancement Pawl Piston 9. This double motion ensures the Advancement Pawl 5 is not continually engaged to the Tooth Actuator 4 and consequently the Tooth Actuator 4 can be reset at any time. However, due to the double action of the Advancement Pawl 5, the Pawl Actuator Element 11 is required to provide actuation displacement of enough length for the pawl engagement and displacement. In some embodiments space requirements may limit the available area for the Pawl Actuator Element 11 and consequently reduce the amount of stroke or displacement which can be generated by the Pawl Actuator Element 11.

Figure 13:
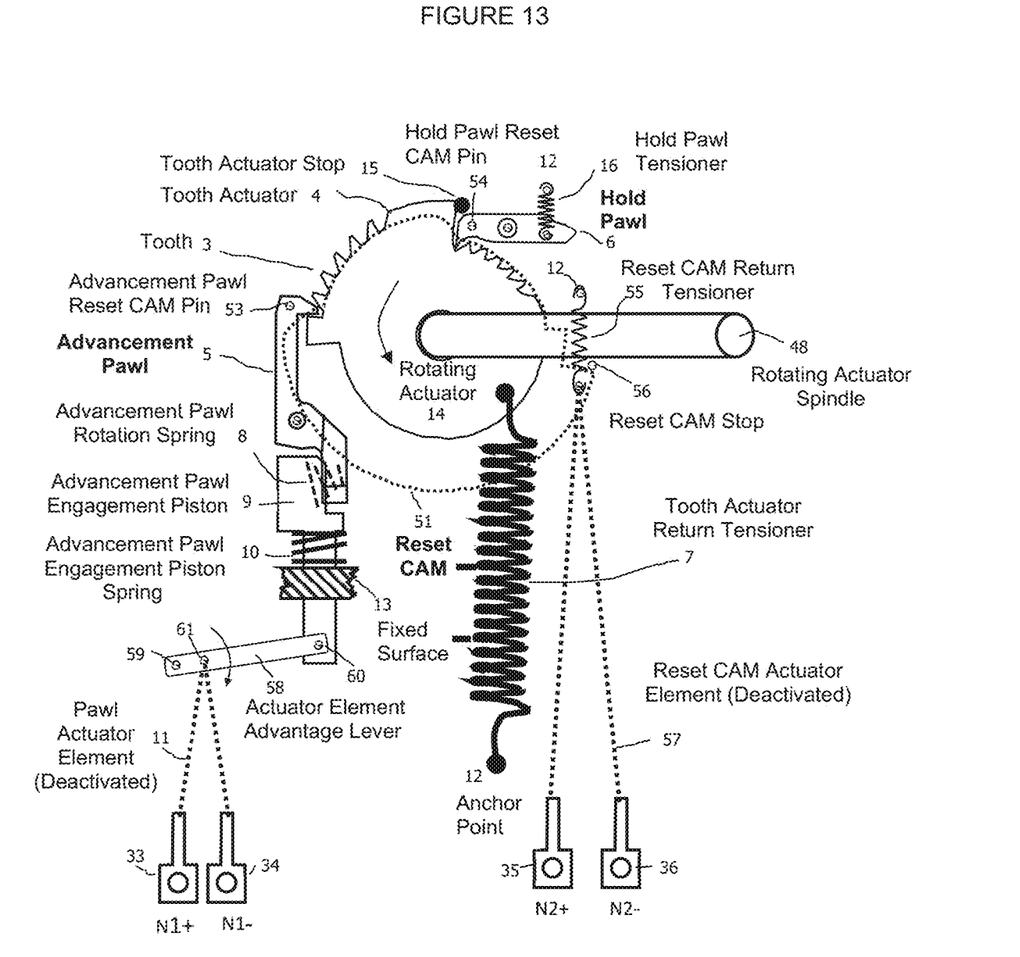
FIG. 13 illustrates a Rotational Pawl Actuator with Reset CAM.

FIG. 13 illustrates an embodiment where an Advancement Pawl Piston 9 is constantly engaged to the Tooth Actuator 4 and does not require the Pawl Actuator Element 11 to provide engagement for advancement. By keeping the Advancement Pawl 5 constantly engaged to the Tooth Actuator 4, there is no need for the Pawl Actuator Element 11 to provide engagement actuation thereby reducing the amount of stroke needed for advancement. However, with the Advancement Pawl Piston 9 continually engaged to the Tooth Actuator 4, a method is needed to retract the Pawl Actuator Element 11 during a reset. Still referring to FIG. 13. An additional Reset CAM 51 has been added and is shown as dotted. The Reset CAM 51 is coaxial to the Tooth Actuator 4 but rotates independently. The Reset CAM 51 further comprises a Reset CAM Return Tensioner 55 which pulls the Reset CAM 51 to a nominal resting position against a Reset CAM Stop 56. The Reset CAM 51 is shaped to engage displacement pins 53, 54 affixed to the advancement and hold pawls 5, 6. In normal operation, the Advancement Pawl 5 and the Hold Pawl 6 continually contact the Tooth Actuator 4 as the Tooth Actuator 4 moves. During an advancement cycle, the Advancement Pawl 5 rotates the Tooth Actuator counterclockwise and when the Tooth Actuator has advanced through a tooth distance the Hold Pawl 6 ensures the Tooth Actuator 4 remains in the new advanced position. As shown in FIG. 13, there are only five positions for advancement. When the Tooth Actuator 4 has been advanced to the last position, the only way to reset the Tooth Actuator 4 back to a starting position is to simultaneously disengage the Advancement Pawl 5 and the Hold Pawl 6 away from the Tooth Actuator 4 where the Tooth Actuator Return Tensioner 7 generates clockwise rotation until the Tooth Actuator 4 rests on the Tooth Actuator Stop 15. The Reset CAM 51 illustrated in FIG. 13 provides the embodiment with a method for simultaneously disengaging pawls. The placement of the Advancement Pawl Reset CAM pin 53 and the Hold Pawl Reset CAM Pin 54 on these pawls provide a method for a cam to push them away from engagement onto the Tooth Actuator 4. The Reset CAM 51 is shaped such that when it rotates clockwise, the cam surface will direct the pawl cam pins away from the Tooth Actuator 4. In this embodiment, the Reset CAM 51 is caused to rotate clockwise through the Hold Pawl Actuator Element 57. As the Reset CAM 51 rotates clockwise, against the tension supplied by the Reset CAM Return Tensioner 55, the Reset CAM 51 engages the pawl pins 53, 54 and moves them away from the Tooth Actuator 4. As a result, the Tooth Actuator Return Tensioner 7 rotates the Tooth Actuator 4 clockwise to a reset position where the Tooth Actuator 4 rests upon the Tooth Actuator Stop 15. The Advancement Pawl 5 illustrated in FIG. 13 is different than the pawl illustrated in FIG. 2. The FIG. 13 Advancement Pawl 5 does not have the Pawl Actuator Element 11 attached to the rotating arm of the Advancement Pawl 5. Instead, the Pawl Actuator Element 11 is directly attached to the Advancement Pawl Engagement Piston 9 to provide the necessary displacement actuation. Another difference is the Advancement Pawl Rotation Spring 8 does not provide expansive spring force to keep the pawl away from the Tooth Actuator 4. Instead, the Advancement Pawl Rotation Spring 8 provides tensional force which drives the Advancement Pawl 5 to stay engaged to the Tooth Actuator 4. While the cam in FIG. 13 describes an embodiment where a single Reset CAM Actuator Element 57 provides a simultaneous reset capability from a single actuator, other multiple actuator embodiments are envisioned. In one embodiment, individual disengage actuator elements are affixed directly to the separate pawls. In another embodiment, a single reset actuator element is affixed and routed to the pawls through methods show in FIG. 10. FIG. 13 further illustrates an embodiment of an Actuator Element Advantage Lever 58. This lever has a pivot 59 at one end and a piston attach point 60 at the other end. The Pawl Actuator Element 11 is attached 61 to the Actuator Element Advantage Lever 58 between the pivot 59 and the piston attach point thereby producing mechanical distance amplification. The closer the Pawl Actuator Element 11 attachment 61 is to the pivot, the higher the mechanical distance amplification generated. Alternatively, the Actuator Element Advantage Lever 58 in another embodiment may be configured to reduce mechanical distance amplification and instead, increase the effective actuator element force.

Figure 14:
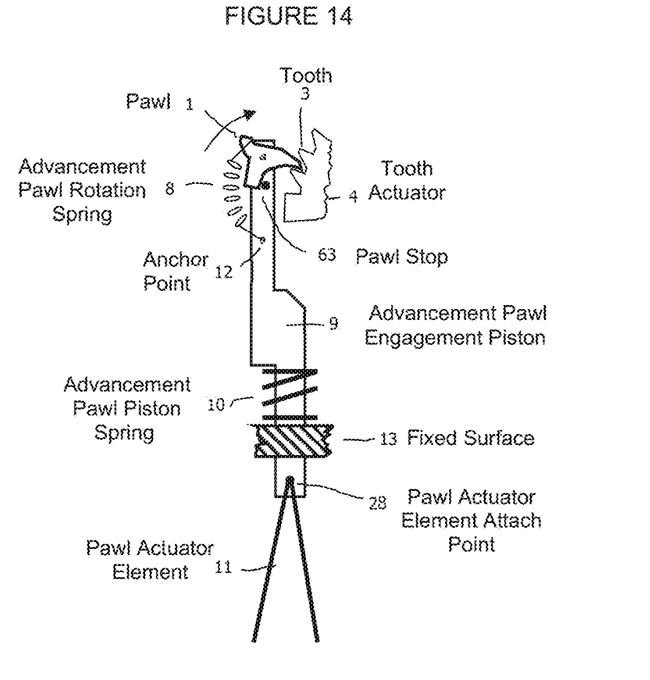
FIG. 14 illustrates an alternate constantly engaged Pawl Actuator.

FIG. 14 illustrates an embodiment of a Pawl 1 similar to the advancement pawl described for the embodiment in FIG. 13 and having the same function. In the FIG. 14 embodiment, Pawl 1 is smaller, and the Advancement Pawl Rotation Spring 8 holds the Pawl 1 against the Pawl Stop 63 when the Advancement Pawl Engagement Piston 9 is pulling the Tooth Actuator 4 downward during advancement. When the Advancement Pawl Engagement Piston 9 returns upward through the expansion of the Advancement Pawl Piston Spring 10, the Pawl 1 is allowed to glide over the Tooth Actuator 4 because of its shape and the allowance of the Advancement Pawl Rotation Spring 8 to enable the Pawl 1 rotate clockwise and clear the next Tooth 3 on the Tooth Actuator 4.

In the foregoing description and in the accompanying drawings, specific terminology and drawing symbols are set forth to provide a thorough understanding of the present invention. In some instances, the terminology and symbols may imply specific details that are not required to practice the invention. For example, a tensioner may be shown as a wire spring but may also be implemented in other forms. Elements shown as tensioners may also be alternatively implemented with structures that create expansive force such as compressed spring. Actuator element technology is referred to throughout this disclosure and are illustrated as shape-metal memory alloys. The illustrations are shown with actuator elements as wires which are energized by sending electrical current through them. These actuator elements may also be comprised of but not limited to any shape-metal memory alloys structures, solenoids, hydraulics or pneumatics. In the following figures and accompanying descriptions, embodiments are shown with both rotational and linear actuators with different elements and structures. Structures and implementation embodiments shown for rotational actuators may also be applied to linear actuators and vice-versa even though they may not be explicitly represented in a figure. Actuators are generally shown as a single monolithic element but may be implemented as multiple elements. While teeth and pawls in the disclosing figures appear of similar size, embodiments allow for teeth and pawls of significant size disparity. While different pawls are shown in different positions relative to each other, they may be implemented in any relative position and direction. The shapes of the different pawls and teeth shown in the figures are illustrative. Other embodiments of pawl and tooth shapes are anticipated. The terms "exemplary" and "embodiment" are used to express an example, not a preference or requirement. Also, the terms "may" and "can" are used interchangeably to denote optional (permissible) subject matter. The absence of either term should not be construed as meaning that a given feature or technique is required.

Various modifications and changes can be made to the embodiments presented herein without departing from the broader spirit and scope of the disclosure. For example, features or aspects of any of the embodiments can be applied in combination with any other of the embodiments or in place of counterpart features or aspects thereof. Accordingly, the specification and drawings are to be regarded in an illustrative rather than a restrictive sense.

What is claimed is:

1. An actuator system comprising:
   a tooth actuator comprising teeth on a surface;
   a tensioner to apply a tension force to the tooth actuator;
   a movable and controllable hold pawl to hold the tooth actuator stationary, through disengage-able contact with at least one of the teeth, with respect to a direction of the tension force while allowing the tooth actuator to move freely in a direction opposite the direction of the tension force;

a movable and controllable advancement pawl having at least two degrees of freedom that enable engagement of the moveable and controllable advancement pawl with a first one of the teeth on the tooth actuator and displacement of the tooth actuator a distance in the direction opposite of the direction of the tension force; and a contracting linear actuator, attached to the movable and controllable advancement pawl, a pulling force of which (i) causes the engagement via a rotational movement of the movable and controllable advancement pawl and (ii) after the rotational movement ceases, causes the displacement via linear movement of the movable and controllable advancement pawl.

2. The actuator system of claim 1 wherein the tooth actuator produces linear motion.

3. The actuator system of claim 1 wherein the tooth actuator produces angular motion.

4. The actuator system of claim 1 wherein the movable and controllable hold pawl comprises and is actuated by shape memory metal.

5. The actuator system of claim 1 wherein the contracting linear actuator comprises shape memory metal.

6. The actuator system of claim 1 wherein the tooth actuator comprises a tooth actuator stop which limits a total displacement distance of the actuator system.

7. The actuator system of claim 1 wherein the movable and controllable advancement pawl motion comprises and is controlled by a pin and a cam.

8. The actuator system of claim 1 wherein the tooth actuator comprises position encoding patterns.

9. The actuator system of claim 1 wherein the tooth actuator comprises a first actuator having a first number of teeth, and a second actuator attached to the first actuator and having a second number of teeth, the second number being fewer than the first number.

10. The actuator system of claim 9 wherein an additional hold pawl is attached to the first actuator.

11. An actuator system comprising:
a tooth actuator comprising teeth on a surface;
a tensioner to apply a tension force to the tooth actuator;
means for holding the tooth actuator stationary, through disengage-able contact with at least one of the teeth, with respect to a direction of the tension force while allowing the tooth actuator to move freely in a direction opposite the direction of the tension force; and
a movable and controllable advancement pawl having at least two degrees of freedom that enable engagement of the moveable and controllable advancement pawl with a first one of the teeth on the tooth actuator and displacement the tooth actuator a distance in the direction opposite of the direction of the tension force; and a linear actuator, attached to the movable and controllable advancement pawl, wherein contraction of the linear actuator first rotates the movable and controllable advancement pawl to effectuate the engagement and subsequently linearly moves the movable and controllable advancement pawl to produce the displacement.

12. The actuator system of claim 11 wherein the linear actuator comprises shape memory metal.

13. The actuator system of claim 11 wherein the tooth actuator produces linear motion.

14. The actuator system of claim 11 wherein the means for holding the tooth actuator stationary comprises a hold pawl operable to engage and disengage at least one of the teeth.

15. The actuator system of claim 11 wherein the means for holding the tooth actuator stationary comprises a hold plate operable to engage and disengage one or more one-way features on a second surface of the tooth actuator.

16. The actuator system of claim 11 wherein a desired path of the movable and controllable advancement pawl is controlled by a pin and a cam.

17. An actuator system comprising:
a tooth actuator comprising teeth on a surface;
a tensioning means for applying a tension force to the tooth actuator;
means for holding the tooth actuator stationary with respect to a direction of the tension force while allowing the tooth actuator to move freely in a direction opposite the direction of the tension force;
an advancement pawl having at least two degrees of freedom including (i) a rotational movement that enables engagement of the advancement pawl with a first one of the teeth on the tooth actuator and (ii) a linear movement that enables displacement of the tooth actuator a distance in the direction opposite of the direction of the tension force; and
a linear actuator, attached to the advancement pawl, through which current is passed to cause the linear actuator to contract and provide actuation of the advancement pawl by way of the rotational movement followed by the linear movement.

18. The actuator system of claim 17 wherein the means for holding the tooth actuator stationary comprises a hold pawl operable to engage and disengage at least one of the teeth.

19. The actuator system of claim 17 wherein the means for holding the tooth actuator stationary comprises a hold plate operable to engage and disengage one or more one-way features on a second surface of the tooth actuator.

20. The actuator system of claim 17 wherein a desired path of the movable and controllable advancement pawl is controlled by guiding a pin attached to the movable and controllable advancement pawl through a cam implementing the desired path.

* * * * *